3,344,920
SETTLING JIG WITH SETTLING COMPARTMENTS ON BOTH SIDES OF A COMPRESSED AIR SUPPLY
Friedrich Wilhelm Mayer and Alexander Lotz, Bochum, and Hanns Stern, Dortmund, Germany, assignors to Westfalia Dinnendahl Groppel Aktiengesellschaft, Bochum, Germany, a corporation of Germany
Filed Sept. 10, 1964, Ser. No. 395,466
8 Claims. (Cl. 209—457)

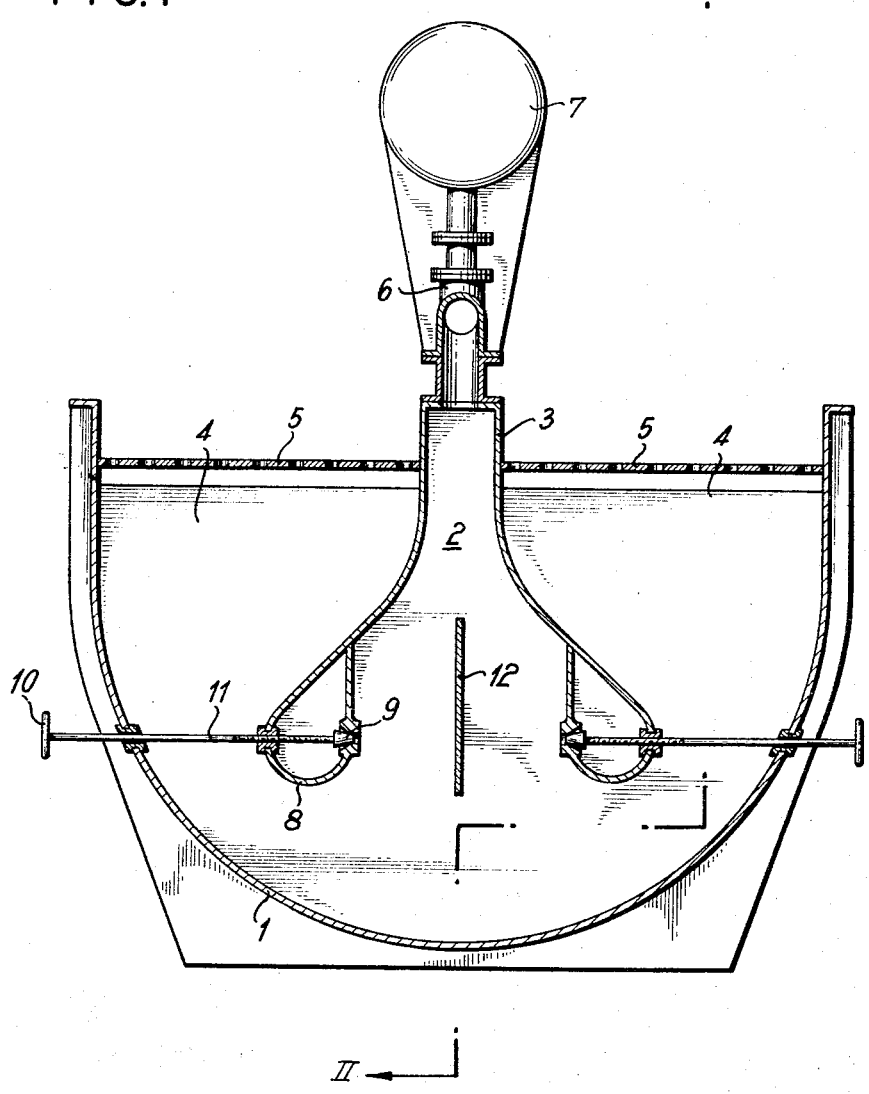

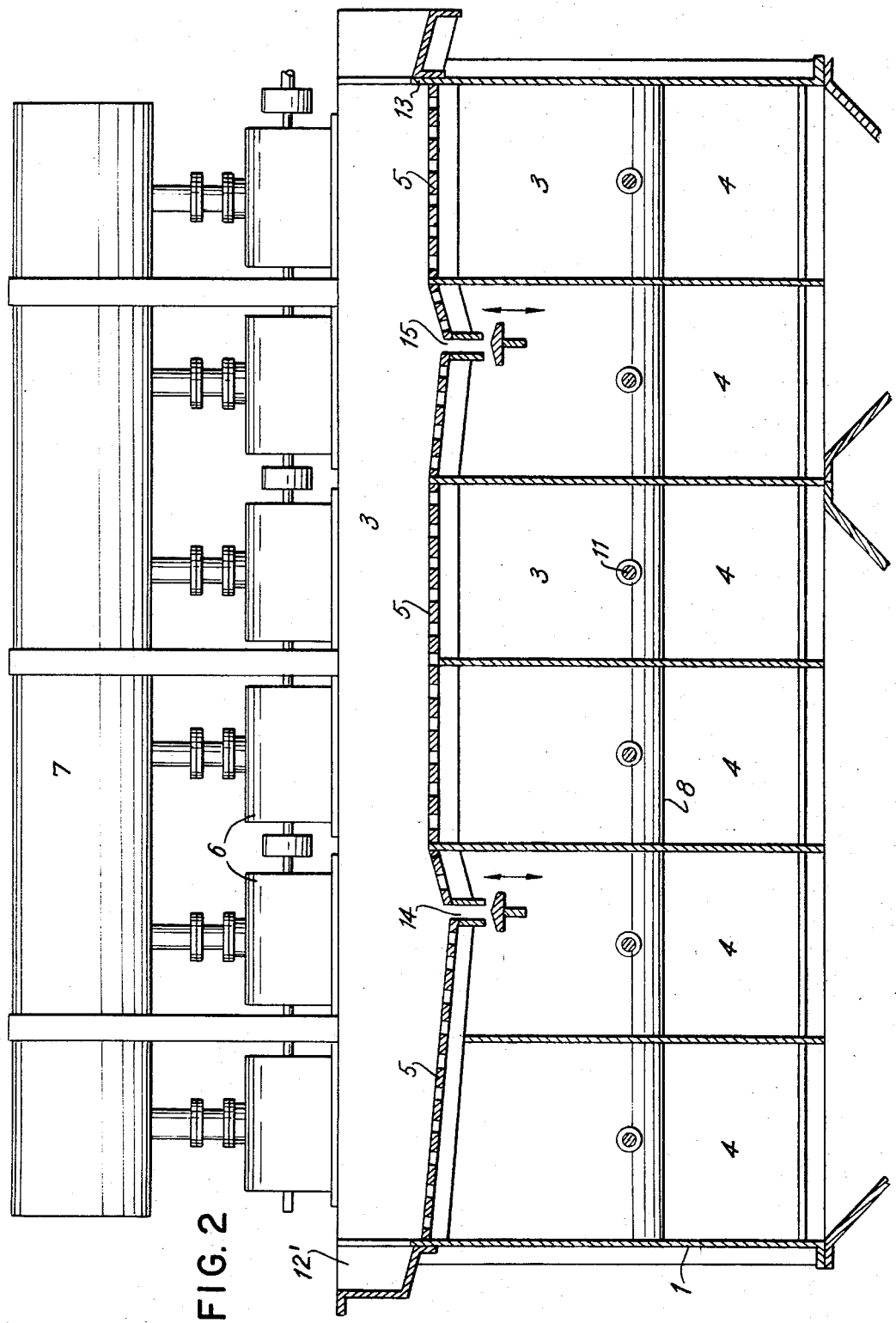

Our invention relates to settling jigs for separating, grading, sorting, washing, concentrating, or related purposes. In a more particular aspect, the invention relates to twin-screen jigs operated with compressed air in which two settling compartments are symmetrically located on opposite sides of the central compressed air supply duct.

The present development of settling jigs aims at increasing the throughput per machine unit to keep pace with the improvements in modern mining operations, the resulting increase in output capacity, and the correspondingly increasing demands to be met by beneficiation equipment. The relatively limited supply of feed material per square yard settling or screening surface, the possibility of substituting a number of conventionally parallel operating settling jigs by a single machine in order to simplify the main line of a beneficiation plant, as well as the greater facility of centrally supervising and automating the beneficiation processes, have resulted in tendency to increase the size of the jig units. However, in screening jigs, a widening of the settling bed, which in this case is substantially the only means of increasing the throughput, encounters rather narrow limits because securing a uniform feed distribution and a uniform flow-impingement of the settling bed become disproportionately difficult with larger widths of the settling beds.

There is a known jig of the twin-bed type operated by compressed air in which two settling compartments are arranged on both sides respectively of a central air pressure chamber. The width of each of the two settling screens is approximately equal to the width of the air pressure chamber so that the machine occupies a relatively large space while offering a relatively small utilizable settling-screen surface. Furthermore, the separating action of the jig is unsatisfactory for larger settling-bed widths.

It is accordingly an object of our invention to provide a settling-jig machinery which obviates such shortcomings of the known jigs.

More specifically, it is an object of the invention to provide a twin-bed settling jig operated with compressed air which offers a large usable settling surface in comparison with its overall width and which nevertheless secures a uniform impingement of fluid current upon this entire, wide area of the settling surface, thus securing a superior classifying or washing performance.

Another object of the invention is to reduce the overall size and weight of suction-type settling jigs without detrimentally affecting the mechanical strength or other desired characteristics.

According to our invention, a settling jig comprises a tank structure in which the upper portion of the interior is subdivided by a compressed air chamber structure which extends from above centrally into the tank space and which has a downwardly extending open side spaced from the bottom of the tank, the chamber structure dividing the tank space into two symmetrically arranged settling compartments communicating beneath the chamber structure with each other and with the air pressure chamber in the structure. Furthermore, the compressed air chamber structure has an upper portion of smaller width and a lower portion of larger width, the lower portion having a gradually bulging shape, and a gradually curved, stream-lined contour.

According to another feature of the invention, the upper portion of the centrally located air chamber has vertical walls, and the lower portion of these walls forms respective hollow bulges of flow promoting or stream-lined shape. The width of the portion at the level of the settling surface determined by the settling screen is rather small in comparison with the horizontal width of the screens so that the ratio of chamber width to screen width at the just-mentioned level is at least 3:1 and preferably approximately 8:1, in contrast to comparable known machines in which the ratio of chamber width to screen width at the level of the screens is only about 2:1.

According to another feature of the invention, the lower ends of the chamber walls, which as mentioned above are formed as bulging and stream-lined bodies, have a hollow inner space which is constructed as a duct for supplying to the settling compartment the flow of water that is to rise through the settling beds. This supply of water passes from the hollow spaces through slots or openings of different shape into the air-pressure chamber or into the settling compartments. The quantity of water issuing from the duct is preferably controllable by means of valves or sliders actuable with the aid of hand wheels located on the external walls of the settling compartments so as to be readily accessible. If desired, however, the quantity of water supplied from below the settling screens and issuing from the above-mentioned ducts can be controlled separately for the two settling compartments, either independently of each other or in dependence upon the pressure beneath the screen carrying the settling-bed material, and the latter control may also be effected automatically. Such a separate control of the rising water is preferable to a joint control in order to prevent the water from draining to the side carrying the lower load when the two settling screens are unequally loaded by respectively different quantities of feed material.

According to another feature of the invention, a similar purpose is served by providing the jig with a vertical partition mounted in the lower portion of the air-pressure chamber approximately at the height or level of the bulging stream-lined ducts that are formed by the lower wall portions of the air chamber structure. The partition subdivides the supply of water from these ducts and exerts a separating or deflecting action thereon which causes the water from one duct to flow predominantly into the one adjacent settling compartment only.

It is also of advantage to subdivide the air pressure chamber in known manner by transverse partitions into individual sections so that the quantity of the water supplied from below the settling screens as well as the supply of compressed air can be varied or graduated from section to section along the length of the settling jig.

The invention will be further described with reference to an embodiment of a twin jig operated with compressed air according to the invention, illustrated by way of example on the accompanying drawings in which:

FIG. 1 shows the settling jig in cross section; and
FIG. 2 shows the same jig in longitudinal section, the section being taken along the lines II—II in FIG. 1.

The illustrated jig serves for washing coal. It comprises an elongated tank 1 of U-shaped vertical cross section and of elongated rectangular cross section in the horizontal direction. A compressed air chamber 2 extends longitudinally of the jig. It is centrally located and, seen in vertical cross section according to FIG. 1, is essentially of bell-shaped configuration with its bottom open toward the interior of the tank. The top of the interior air chamber, however, extends to above two lateral settling screens 5 which cover the two settling compartments 4 on the two sides of the channel structure 2. The walls 3 in the top portion of the channel structure 2 are substantially vertical. The width of the chamber structure at the height or level of the screens 5 is rather small, being approximately one-eighth of the total width of the screens. The horizontal top of the chamber structure 3 carries a compressor 6 and devices for controlling and distributing the compressed air in pulsations, as well as a compressed air supply tank 7.

The lower ends of the downwardly widening air chamber 2 are formed by bulging and stream-lined hollow bodies 8 which serve as longitudinal conduits for supplying water. These conduits are provided with openings controllable by means of respective valves 9. The valves are operated with the aid of handwheels 10 secured to partly externally threaded valve rods 11 extending through suitably provided sealed bushings, the handwheels 10 being accessible from the outside of the setting tank. A vertical partition 12 is mounted in the lower portion of the air-pressure chamber 2 in the vicinity of the bulging bodies 8, for the purpose of deflecting the water from each outlet opening of the valves 9 predominantly into the one settling compartment 4 respectively adjacent thereto.

Referring to FIG. 2, the raw coal to be settled is fed onto the screens from the feeder 12' at the left side of the jig. The washed coal obtained by the settling operation issues from an overflow 13 at the right side of FIG. 2. The gangue and the middlings resulting from the settling operation are withdrawn from the beds by outlet slots 14 and 15.

It will be recognized that in a settling jig according to the invention, as exemplified by the illustrated machine, a coupling occupies relatively little space and demands only a rather small amount of material in comparison with the available settling area. Furthermore, the air pressure chamber also serves as a carrier structure for the control mechanism and the compressed air tank and simultaneously contributes greatly to stiffening and bracing the chamber walls which can therefore be made lighter in weight than as heretofore necessary. The constricted upper portion of the air pressure chamber also effects uniform impingement of the water surface with fluid medium, because this surface inside the air chamber is relatively small in comparison with the amount of air being supplied. This is a contributing factor to the favorable settling characteristic obtained with such jigs, aside from the construction based on favorable fluid technology principles of the stream-lined and gradually curving wall surfaces of the air chamber.

To those skilled in the art, it will be obvious upon a study of this disclosure, that our invention permits of various modifications and hence can be given embodiments other than particularly illustrated and described herein, without departing from the essential features of the invention and within the scope of the claims annexed hereto.

We claim:

1. A settling jig comprising means for receiving material to be classified therein, means for discharging gangue and cleaned material therefrom, a tank, a compressed air chamber structure extending from above centrally into the space of said tank and being upwardly spaced from the bottom thereof, said air chamber structure dividing the tank space into two symmetrically arranged settling compartments communicating beneath said air chamber structure with each other and with the air pressure chamber in said structure, said air chamber structure being formed in said tank space of an upper portion of smaller width and a lower portion of larger width, said lower portion having a bulging shape and a gradually curved contour for downwardly narrowing said settling compartments.

2. In a settling jig according to claim 1, said lower portion of said air pressure chamber structure forming two water supply ducts inside the bulging shapes of its two walls adjacent to said respective settling compartments, each of said supply ducts having controllable openings for supplying water substantially to one of said two compartments, respectively.

3. A settling jig comprising means for receiving material to be classified therein, means for discharging gangue and cleaned material therefrom, a tank, a horizontal settling screen extending across the tank space near the top thereof to receive material to be classified, an air pressure chamber structure extending from above the height of said screen into the tank space and ending in upwardly spaced relation to the bottom of said space, said air chamber structure dividing the tank space into two symmetrically arranged settling compartments communicating beneath said chamber structure with each other and with the air pressure chamber in said stucture, said air chamber structure being formed in said tank space of an upper portion with vertical walls and a declining lower portion of larger width and merging with said upper portion, the walls of said lower portion forming respective hollow bodies of convexly rounded cross section.

4. In a settling tank apparatus according to claim 3, said top portion of said chamber structure having at the height of said screen a width whose ratio to the width of said screen is smaller than 1:3.

5. A settling jig comprising means for receiving material to be classified therein, means for discharging gangue and cleaned material therefrom, a tank having a substantially rectangular horizontal cross section and having a plurality of tank spaces separated from one another in horizontal sequence, a horizontal screen extending across each tank space near the top of the tank for receiving material to be classified, an air pressure chamber structure extending from above the height of said screen into the tank space in symmetrical relation to the longitudinal center axis of said rectangular cross section and in upwardly spaced relation to the bottom of the tank, so as to divide each tank space into symmetrical settling compartments communicating beneath said air chamber structure with each other and with the air pressure chamber of said structure, said air chamber structure being formed in said tank space of an upper portion of smaller width and a lower portion of larger width, said lower portion having respective hollow lowermost wall portions of downwardly bulging, streamlined shape, said hollow wall portions forming water supply ducts for said tank spaces.

6. In a settling jig according to claim 5, said air chamber structure having at the height of said screen a width whose ratio to the width of said screen is about 1:8.

7. In a settling jig according to claim 5, said hollow wall portions having water outlet openings on the wall side facing said air pressure chamber, valve means for opening and closing said openings, and control means connected with said respective valve means and accessible for actuation from the outside of said tank spaces.

8. In a settling jig according to claim 5, said air pressure chamber structure having partition means subdividing the chamber into portions located respectively adjacent said two settling compartments.

References Cited

UNITED STATES PATENTS

| 1,789,516 | 1/1931 | Crangle | 209—455 X |
| 2,019,662 | 11/1935 | Drinkwater et al. | 209—500 |
| 2,883,053 | 4/1959 | Smith | 209—493 |

FOREIGN PATENTS

| 7,677 | 5/1902 | Austria. |

HARRY B. THORNTON, Primary Examiner.

TIM R. MILES, Examiner.

L. H. EATHERTON, Assistant Examiner.